(12) United States Patent
Kitchin (10) Patent No.: US 7,852,826 B2
(45) Date of Patent: Dec. 14, 2010

(54) TECHNIQUES TO COMMUNICATION MAP INFORMATION ELEMENTS IN A WIRELESS NETWORK

(75) Inventor: Duncan Kitchin, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 486 days.

(21) Appl. No.: 11/537,293

(22) Filed: Sep. 29, 2006

(65) Prior Publication Data

US 2008/0080474 A1     Apr. 3, 2008

(51) Int. Cl.
*H04J 3/24* (2006.01)
*H04J 3/16* (2006.01)
*H04L 12/28* (2006.01)
*H03M 13/00* (2006.01)

(52) U.S. Cl. .................. 370/349; 370/389; 370/466; 714/776

(58) Field of Classification Search ............ None
See application file for complete search history.

(56) References Cited

U.S. PATENT DOCUMENTS

| | | | | |
|---|---|---|---|---|
| 5,644,576 | A * | 7/1997 | Bauchot et al. ............ | 370/437 |
| 6,490,521 | B2 | 12/2002 | Wiener | |
| 6,791,472 | B1 | 9/2004 | Hoffberg | |
| 7,035,734 | B2 | 4/2006 | Shaffer et al. | |
| 7,164,697 | B1 * | 1/2007 | Beser ........................ | 370/485 |
| 2002/0120728 | A1 | 8/2002 | Braatz et al. | |
| 2003/0012223 | A1 * | 1/2003 | Chappell et al. ........... | 370/468 |
| 2003/0112759 | A1 * | 6/2003 | Zhang et al. .............. | 370/236 |
| 2004/0001499 | A1 * | 1/2004 | Patella et al. ............. | 370/412 |
| 2004/0072569 | A1 * | 4/2004 | Omae et al. ............... | 455/445 |
| 2004/0181800 | A1 * | 9/2004 | Rakib et al. ............... | 725/25 |
| 2005/0243775 | A1 * | 11/2005 | Rhee et al. ................ | 370/336 |
| 2005/0265397 | A1 * | 12/2005 | Chapman et al. .......... | 370/490 |
| 2006/0025079 | A1 * | 2/2006 | Sutskover et al. ......... | 455/67.11 |
| 2006/0126660 | A1 * | 6/2006 | Denney et al. ............ | 370/468 |
| 2006/0160545 | A1 * | 7/2006 | Goren et al. .............. | 455/456.1 |
| 2006/0171406 | A1 * | 8/2006 | Kwon et al. .............. | 370/419 |
| 2006/0195767 | A1 * | 8/2006 | Ihm et al. ................. | 714/776 |
| 2007/0047478 | A1 * | 3/2007 | Balachandran et al. .... | 370/328 |
| 2007/0076664 | A1 * | 4/2007 | An et al. .................. | 370/331 |
| 2007/0086434 | A1 * | 4/2007 | Venkatachalam et al. .. | 370/352 |
| 2007/0110062 | A1 * | 5/2007 | Balay et al. .............. | 370/390 |
| 2007/0195824 | A9 * | 8/2007 | Chapman et al. .......... | 370/490 |
| 2007/0243879 | A1 * | 10/2007 | Park et al. ................. | 455/453 |
| 2007/0286066 | A1 * | 12/2007 | Zhang et al. .............. | 370/208 |

FOREIGN PATENT DOCUMENTS

WO     2008042723 A1    4/2008

OTHER PUBLICATIONS

"International Search Report and Written Opinion", PCT/US2007/079776, (Feb. 20, 2008),10 pgs.

* cited by examiner

*Primary Examiner*—Huy D Vu
*Assistant Examiner*—Brandon Renner
(74) *Attorney, Agent, or Firm*—Kacvinsky Daisak PLLC (57) ABSTRACT

Techniques to communicate MAP information elements in a wireless network are described. An apparatus may comprise a device to establish a communication channel over a common wireless communication link, the device to communicate an encapsulating MAP information element to encapsulate one or more MAP information elements. The encapsulating MAP information element may indicate that the one or more encapsulated MAP information elements apply to multiple communication frames. Other embodiments are described and claimed.

19 Claims, 6 Drawing Sheets

Bitmap Field 302 | 1 1 0

Bitmap Length Field 304 | 0 0 1 1

Bitmap Offset Field 306 | 0 0 0 1

Sequence Length Field 308 | 0 0 0 1 0 0 1 0

The above pattern specification describes a pattern of period 3 ("110"), starting with the bit numbered "1" corresponding to the current frame, and repeating for a total length of 18 frames, as illustrated below.

Frame Sequence 310

500 establish a communication channel over a common wireless communication link
502 communicate an encapsulating MAP information element to encapsulate a MAP structure, the MAP information element to indicate the MAP structure applies to multiple communication frames
504

TECHNIQUES TO COMMUNICATION MAP INFORMATION ELEMENTS IN A WIRELESS NETWORK

BACKGROUND

Wireless communication systems communicate information over a shared wireless communication medium such as one or more portions of the radio-frequency (RF) spectrum. Demand for use of the limited RF spectrum is high, therefore creating a constant need to improve bandwidth efficiency and utilization. In many cases, wireless communication systems typically communicate control information to assist in the coordination and management of various wireless devices. The use of such control information is typically referred to generally as communication overhead. Reductions in communication overhead may result in an increase in the amount of data traffic carried by a wireless communication system, thereby leading to improved bandwidth efficiency.

DETAILED DESCRIPTION

Various embodiments may be generally directed to wireless communication systems. Some embodiments may be directed to reducing communication overhead in a wireless communication system, such as a wireless metropolitan area network (WMAN or WirelessMAN). In one embodiment, for example, a wireless device may be used to communicate MAP information elements carried by communication frames over a wireless communication link to improve bandwidth utilization for the wireless device. This may reduce communication overhead thereby providing communication bandwidth for communicating other information, such as the transmission of media content.

In one embodiment, for example, a wireless communication link between a transmitter node and a receiver node may comprise a communication channel, such as a management or control channel. A wireless device such as the transmitter node may be arranged to communicate an encapsulating MAP information element to encapsulate a repeating data element, such as a MAP information element, as defined by various communication standards which are described further below. The encapsulating MAP information element may provide control or management information to indicate that the MAP information element applies to multiple communication frames. As a result, the transmitter node does not necessarily need to transmit a MAP information element with every communication frame, thereby potentially decreasing communication overhead. Other embodiments are described and claimed.

Figure 1:
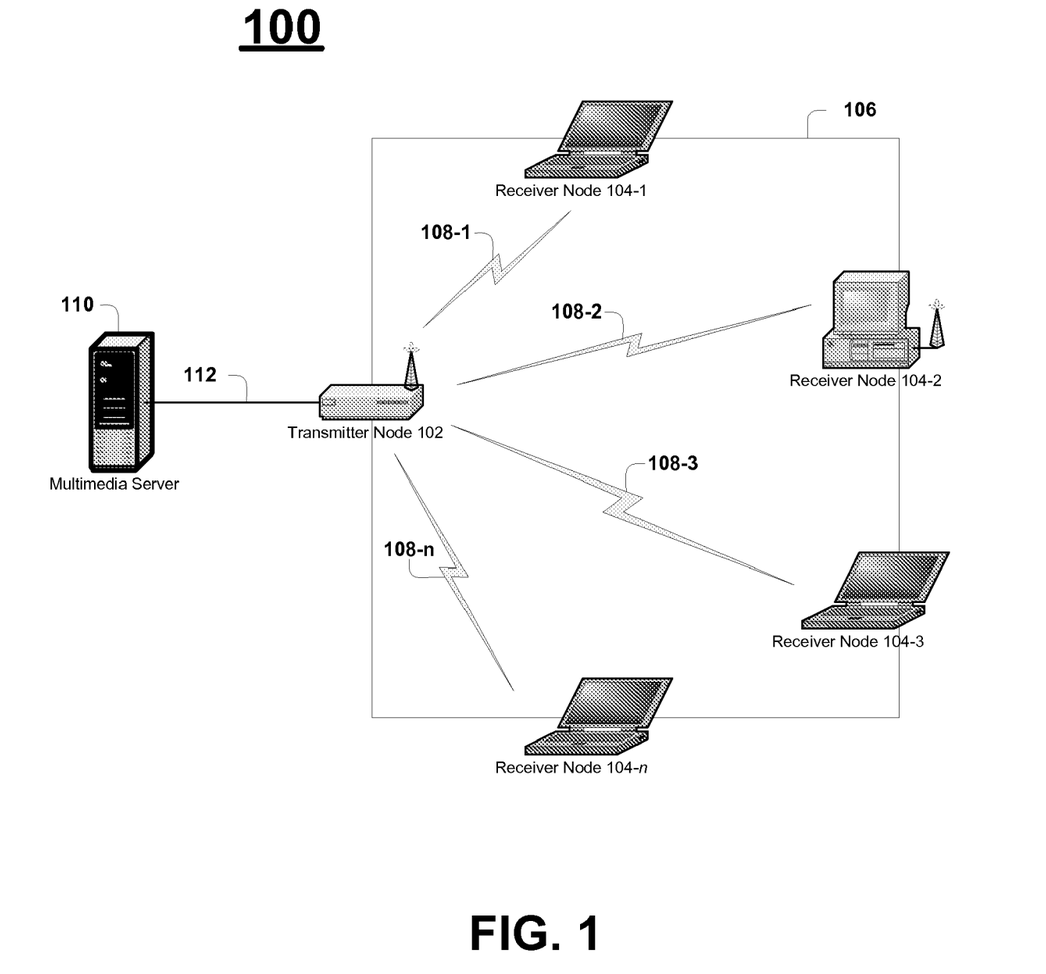
FIG. 1 illustrates one embodiment of a communications system.

FIG. 1 illustrates a block diagram of one embodiment of a communications system 100. In various embodiments, the communications system 100 may comprise multiple nodes. A node generally may comprise any physical or logical entity for communicating information in the communications system 100 and may be implemented as hardware, software, or any combination thereof, as desired for a given set of design parameters or performance constraints. Although FIG. 1 may show a limited number of nodes by way of example, it can be appreciated that more or less nodes may be employed for a given implementation.

The nodes of the communications system 100 may be arranged to communicate one or more types of information, such as media information and control information. Media information generally may refer to any data representing content meant for a user, such as image information, video information, graphical information, audio information, voice information, textual information, numerical information, alphanumeric symbols, character symbols, and so forth. Control information generally may refer to any data representing commands, instructions or control words meant for an automated system. For example, control information may be used to route media information through a system, or instruct a node to process the media information in a certain manner. The media and control information may be communicated from and to a number of different devices or networks.

In various embodiments, the communications system 100 may comprise, or form part of a wired communications system, a wireless communications system, or a combination of both. For example, the communications system 100 may include one or more nodes arranged to communicate information over one or more types of wired communication links. Examples of a wired communication link, may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The communications system 100 also may include one or more nodes arranged to communicate information over one or more types of wireless communication links. Examples of a wireless communication link may include, without limitation, a radio channel, infrared channel, radio-frequency (RF) channel, Wireless Fidelity (WiFi) channel, a portion of the RF spectrum, and/or one or more licensed or license-free frequency bands.

The communications system 100 may communicate information in accordance with one or more standards as promulgated by a standards organization, such as the International Telecommunications Union (ITU), the International Organization for Standardization (ISO), the International Electrotechnical Commission (IEC), the Institute of Electrical and Electronics Engineers (information IEEE), the Internet Engineering Task Force (IETF), and so forth. In various embodiments, for example, the communications system 100 may communicate information according to one or more IEEE 802.11 standards for wireless local area networks (WLANs) such as the information IEEE 802.11 standard (1999 Edition, Information Technology Telecommunications and Information Exchange Between Systems—Local and Metropolitan Area Networks—Specific Requirements, Part 11: WLAN Medium Access Control (MAC) and Physical (PHY) Layer Specifications), its progeny and supplements thereto (e.g., 802.11a, b, g/h, j, n, and variants); IEEE 802.16 standards for WMAN including the IEEE 802.16 standard such as 802.16-2004, 802.16.2-2004, 802.16e-2005, 802.16f, and variants; and other wireless networking standards. The embodiments are not limited in this context.

The communications system 100 may communicate, manage, or process information in accordance with one or more protocols. A protocol may comprise a set of predefined rules or instructions for managing communication among nodes.

In various embodiments, for example, the communications system 100 may employ one or more protocols such as medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), and so forth.

The communications system 100 also may be arranged to operate in accordance with standards and/or protocols for media processing. Examples of media processing standards include, without limitation, the Digital Video Broadcasting Terrestrial (DVB-T) broadcasting standard, the ITU/IEC H.263 standard, Video Coding for Low Bitrate Communication, ITU-T Recommendation H.263v3, published November 2000 and/or the ITU/IEC H.264 standard, Video Coding for Very Low Bit Rate Communication, ITU-T Recommendation H.264, published May 2003, Motion Picture Experts Group (MPEG) standards (e.g., MPEG-1, MPEG-2, MPEG-4), and/or High performance radio Local Area Network (HiperLAN) standards. Examples of media processing protocols include, without limitation, Session Description Protocol (SDP), Real Time Streaming Protocol (RTSP), Real-time Transport Protocol (RTP), Synchronized Multimedia Integration Language (SMIL) protocol, and/or Internet Streaming Media Alliance (ISMA) protocol. The embodiments are not limited in this context.

As shown in FIG. 1, the communications system 100 may comprise a transmitter node 102 coupled to a plurality of receiver nodes 104-1-$n$, where n may represent any positive integer value. In various embodiments, the transmitter node 102 and the plurality of receiver nodes 104-1-$n$ may be implemented as wireless devices. Examples of wireless devices may include, without limitation, a subscriber station, a base station, a wireless access point (AP), a wireless client device, a wireless station (STA), a laptop computer, ultra-laptop computer, portable computer, personal computer (PC), notebook PC, handheld computer, personal digital assistant (PDA), cellular telephone, combination cellular telephone/PDA, smart phone, pager, messaging device, media player, digital music player, set-top box (STB), appliance, workstation, user terminal, mobile unit, and so forth. In such embodiments, the transmitter node 102 and the receiver nodes 104-1-$n$ may comprise one more wireless interfaces and/or components for wireless communication such as one or more transmitters, receivers, transceivers, chipsets, amplifiers, filters, control logic, network interface cards (NICs), antennas, and so forth. Examples of an antenna may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth.

In various embodiments, the transmitter node 102 and the receiver nodes 104-1-$n$ may comprise or form part of a wireless network 106. In one embodiment, for example, the wireless network 106 may be implemented in accordance with a broadband wireless architecture as standardized by the IEEE 802.16 Working Group (WG) and the Worldwide Interoperability for Microwave Access (WiMAX) forum. The 802.16 WG is developing a series of standards for the Physical (PHY) and medium access control (MAC) layers, as well as for the security and higher-layer network model. The terms 802.16 and WiMAX as used herein may be interchangeable. In such an embodiment, the wireless network 106 may communicate information in accordance with one or more of the IEEE 802.16 series of standards for WiMAX and associated protocols. In a WiMAX network the transmitter node 102 may comprise a base station communicatively coupled to one or more receiver nodes 104-1-$n$ comprising wireless clients referred to as subscriber stations.

Although some embodiments may be described with the wireless network 106 implemented as a WiMAX network for purposes of illustration, and not limitation, it can be appreciated that the embodiments are not limited in this context. For example, the wireless network 106 may comprise or be implemented as various types of wireless networks and associated protocols suitable for a WMAN, a Wireless Personal Area Network (WPAN), a Wireless Wide Area Network (WWAN), a Broadband Wireless Access (BWA) network, a radio network, a television network, a satellite network such as a direct broadcast satellite (DBS) network, and/or any other wireless communications network configured to operate in accordance with the described embodiments.

As shown in the embodiment of FIG. 1, the transmitter node 102 may be coupled to receiver nodes 104-1-$n$ by wireless communication links 108-$n$. A particular wireless communication link (e.g., wireless communication link 108-1) may be arranged to establish one or more common or dedicated connections between the transmitter node 102 and a particular receiver node (e.g., receiver node 104-1). In various embodiments, a particular wireless communication link (e.g., wireless communication link 108-1) may include multiple virtual channels, with each of the virtual channels comprising a point-to-point logical connection from the transmitter node 102 to a particular receiver node (e.g., receiver node 104-1). In various implementations, multiple virtual channels may share a physical link, with each virtual channel comprising dedicated resources or bandwidth of the physical link.

In various embodiments, the transmitter node 102 and the receiver nodes 104-1-$n$ may be arranged to implement the IEEE 802.16 MAC layer operations. For example, the IEEE 802.16 MAC layer performs the standard MAC layer function of providing a medium-independent interface to the 802.16 PHY layer. Because the 802.16 PHY is a wireless PHY layer, the main focus of the MAC layer is to manage the resources of the air link in an efficient manner. The 802.16 MAC protocol is designed to support Point to Multipoint (PMP) and Mesh network models. Further, the 802.16 MAC protocol is connection oriented. Upon entering the network, each subscriber station creates one or more connections over which their data are transmitted to and from the base station. The MAC layer schedules the usage of the air link resources and provides Quality of Service (QoS) differentiation. It performs link adaptation and Automatic Repeat Request (ARQ) functions to maintain target Bit Error Rates (BER) while maximizing the data throughput. The MAC layer also handles network entry for subscriber stations that enter and leave the network, and it performs standard Protocol Data Unit (PDU) creation tasks. Finally, the MAC layer provides a convergence sub layer that supports Asynchronous Transfer Mode (ATM) cell-based and packet-based network layers.

In various embodiments, the transmitter node 102 and the receiver nodes 104-1-$n$ may be arranged to implement the IEEE 802.16 orthogonal frequency division multiplexing access (OFDMA) PHY layer operations. The OFDMA PHY layer supports Time Division Duplexing (TDD) and Frequency Division Duplexing (FDD) operations, with support for both FDD and Half-Duplex FDD (H-FDD) subscriber stations. The 802.16 specification defines a Convolutional Coding (CC) scheme. Variable-rate Block Turbo Code (BTC) and Convolutional Turbo Code (CTC) are also optionally supported. The standard supports multiple modulation levels, including Binary Phase Shift Keying (BPSK), Quadrature Phase Shift Keying (QPSK), 16-Quadrature Amplitude Modulation (QAM) and 64-QAM. Finally, the PHY supports (as options) transmit diversity in the Downlink (DL) using Space Time Coding (STC) and Adaptive Antenna Systems (AAS) with Spatial Division Multiple Access (SDMA).

In various embodiments, the transmitter node 102 and the receiver nodes 104-1-$n$ may be arranged to implement a transmit diversity scheme. The transmit diversity scheme uses two antennas at the base station to transmit an STC encoded signal, in order to provide the gains that result from second-order diversity. Each of two antennas transmits a different symbol (two different symbols) in the first symbol time. The two antennas then transmit the complex conjugate of the same two symbols in the second symbol time. The resulting data rate is the same as without transmit diversity. AAS is used in the 802.16 specification to describe beam forming techniques, where an array of antennas is used at the base station to increase gain to the intended subscriber station, while nulling out interference to and from other subscriber stations and interference sources. AAS techniques can be used to enable SDMA, where multiple subscriber stations that are separated in space can receive and transmit on the same subchannel at the same time. By using beam forming, the base station is able to direct the desired signal to the different subscriber stations and can distinguish between the signals of different subscriber stations even though they are operating on the same subchannel(s).

In various embodiments, the transmitter node 102 and the receiver nodes 104-1-$n$ may be arranged to communicate various types of information in multiple communication frames. The various types of information may include image information, audio information, video information, audio/visual (A/V) information, and/or other data provided from the media source 108. In various embodiments, the information may be associated with one or more images, image files, image groups, pictures, digital photographs, music file, sound files, voice information, videos, video clips, video files, video sequences, video feeds, video streams, movies, broadcast programming, television signals, web pages, user interfaces, graphics, textual information (e.g., encryption keys, serial numbers, e-mail messages, text messages, instant messages, contact lists, telephone numbers, task lists, calendar entries, hyperlinks), numerical information, alphanumeric information, character symbols, and so forth. The information also may include command information, control information, routing information, processing information, system file information, system library information, software (e.g., operating system software, file system software, application software, game software), firmware, an application programming interface (API), a program, an applet, a subroutine, an instruction set, an instruction, computing code, logic, words, values, symbols, and so forth.

The transmitter node 102 may be arranged to receive media content from a media source node 110 to be unicast or multicast to one or more of the receiver nodes 104-1-$n$. In various embodiments, the transmitter node 102 may be arranged to receive media content from the source node 110. The media source node 110 generally may comprise any media source capable of delivering static or dynamic media content to the transmitter node 102. In one embodiment, for example, the media source node 110 may comprise a multimedia server arranged to provide broadcast or streaming media content to the transmitter node 102. In some implementations, the media source node 110 may form part of a media distribution system (DS) or broadcast system such as an over-the-air (OTA) broadcast system, a radio broadcast system, a television broadcast system, a satellite broadcast system, and so forth. In some implementations, the media source node 110 may be arranged to deliver media content pre-recorded and stored in various formats for use by a device such as a Digital Versatile Disk (DVD) device, a Video Home System (VHS) device, a digital VHS device, a digital camera, video camera, a portable media player, a gaming device, and so forth.

As shown in the embodiment of FIG. 1, for example, the transmitter node 102 may be coupled to the media source node 110 through a communication medium 112. The communication medium 112 generally may comprise any medium capable of carrying information signals such as a wired communication link, wireless communication link, or a combination of both, as desired for a given implementation. In various embodiments, the communication medium 112 may comprise a wired communication link implemented as a wired Ethernet and/or P2P connection, for example. In such embodiments, information may be communicated over the communication medium 112 in accordance with the information IEEE 802.3, and the transmitter node 102 may receive media content from the media source node 110 substantially loss-free.

Although some embodiments may be described with the communication medium 112 implemented as a wired Ethernet and/or P2P connection for purposes of illustration, and not limitation, it can be appreciated that the embodiments are not limited in this context. For example, the communication medium 112 between the transmitter node 102 and the source node 110 may comprise various types of wired and/or wireless communication media and, in some cases, may traverse one or more networks between such devices.

The transmitter node 102 may be arranged to buffer media content and to parse or fragment the media content into communication frames for unicast or multicast transmission to the receiver nodes 104-1-$n$. In some implementations, the transmitter node 102 may be arranged to parse or fragment the received media content as it is read into a buffer. In some embodiments, the media content provided to the transmitter node 102 may be delivered as one or more media frames. Each media frame may comprise a discrete data set having a fixed or varying length, and may be represented in terms of bits or bytes such as 16 kilobytes (kB), for example. It can be appreciated that the described embodiments are applicable to various types of communication content or formats, such as frames, packets, fragments, cells, units, and so forth.

In various embodiments, the transmitter node 102 may be arranged to create a sequence of media frames to be broadcast over one or more of the wireless communication links 108-1-$n$. Each media frame may comprise a discrete data set having fixed or varying lengths, and may be represented in terms of bits or bytes. While multicasting, each media frame may contain a destination address comprising a group address corresponding to multiple intended recipients, such as receiver nodes 104-1-$n$. In some embodiments, the destination address may refer to all receiver nodes 104-1-$n$ within the wireless network 106.

Although some embodiments may be described with the media content fragmented into media frames for purposes of illustration, and not limitation, it can be appreciated that the embodiments are not limited in this context. For example, the described embodiments are applicable to various types of communication content or formats, such as frames, packets, fragments, cells, units, and so forth.

In a WiMAX system, the frame structure for a TDD system is divided into DL and UL subframes. The DL subframe is made up of a preamble, Frame Control Header (FCH), and a number of data bursts. The FCH specifies the burst profile and the length of one or more DL bursts that immediately follow the FCH. The DL-MAP, UL-MAP, DL Channel Descriptor (DCD), UL Channel Descriptor (UCD), and other broadcast messages that describe the content of the frame are typically sent at the beginning of these first bursts, although some may be sent at other times as well. The remainder of the DL subframe is made up of data bursts to individual subscriber stations. Each data burst consists of an integer number of slots (e.g., where a slot is some number of subcarriers and/or symbol intervals) and is assigned a burst profile that specifies the code algorithm, code rate, and modulation level that are used for those data transmitted within the burst. The UL subframe contains a contention interval for initial ranging and bandwidth allocation purposes and UL PHY packet data units (PDU) from different subscriber stations. The DL-MAP and UL-MAP include MAP information, structures or information elements (collectively referred to herein as "MAP information elements") that completely describe the contents of the DL and UL subframes. They specify the subscriber stations that are receiving and/or transmitting in each burst and the coding and modulation used in each burst.

Conventional techniques to communicate MAP information elements, however, may be unsatisfactory for a number of reasons. For example, MAP information elements currently specified for use in WiMAX, are not as efficient as they might be in the particular case of persistently scheduled flows, in that allocations must be indicated for each individual frame as previously described with reference to a WiMAX frame structure. The 802.16 MAC layer and associated controller, when compared with cellular-derived mobile voice and data systems, has a relatively high amount of communication overhead associated with MAP information elements transmitted in every frame. This is a tradeoff in the MAC design since by transmitting MAP information elements in every frame the base station scheduler is able to respond rapidly to changes in demand, and therefore make more efficient use of the available resources when scheduling bursty traffic. Bursty traffic is generally a typical characteristic of Internet traffic, for example. This tradeoff, however, is reliant on the traffic characteristics of a particular flow. In particular, it is disadvantageous for at least the following classes of traffic: (1) voice traffic; (2) constant bit rate multicast-broadcast services such as expected to be used for mobile television; and (3) allocations of regions for control channels such as ranging, fast feedback and HARQ acknowledgement which will typically appear identically in every frame. Because the MAP information elements have to be transmitted in every frame even though an allocation may be repetitive, there is a waste of bandwidth in this case. In addition, this technique provides a lack of robustness, since the loss of such a MAP information element for a given frame means that the data allocation cannot be used in that frame and will be wasted. If a MAP message is corrupted, the specific allocation to which it refers will be lost.

In order to solve these and other problems, various embodiments include techniques for improving communication of MAP information elements in a wireless system. For example, some embodiments specify semi-persistent MAP allocations to improve both the efficiency of a device or network by reducing the communication overhead, and the robustness of a device or network in that a loss of a single message does not cause a loss of the complete allocation. This may provide several advantages. For example, semi-persistent MAP allocation techniques may provide better efficiency by removing the need to transmit MAP information elements in every frame for persistent or semi-persistent MAP allocations (e.g., such as voice). In another example, semi-persistent MAP allocation techniques may improve robustness by either permitting redundancy among multiple persistent MAP allocations to be exploited, or in the case of unicast MAP messages, transferring them via a management connection supporting ARQ. In yet another example, semi-persistent MAP allocation techniques may reduce implementation complexity by permitting reuse of many of the existing MAP definitions included with the various IEEE 802.16 series of standards. In still another example, semi-persistent MAP allocation techniques are fully backwards compatible with legacy 802.16 devices.

There are two general and distinct implementations for the usage of semi-persistent MAP information elements. The first is a semi-persistent unicast technique that applies to unicast MAP information elements. Unicast MAP information elements may be used to allocate bandwidth for a unicast DL or UL transmission. The second is a semi-persistent multicast technique for broadcast or multicast MAP information elements. Multicast MAP information elements may be used to allocate either for a broadcast or multicast DL transmission, or a collection of unicast UL or DL transmissions to or from more than one receiver nodes 104-1-*n* within the wireless network 106.

In both cases, existing or new allocation data elements are enclosed in an encapsulating MAP information element. The encapsulating MAP information element may be used as a data structure used to enclose other data elements. In the case of WiMAX, for example, the data element may comprise one or more MAP information elements. The encapsulating MAP information element or enclosing data structure is a newly defined information element. Since the new information element type code is not recognized by legacy devices, the entire data structure is ignored by such devices, as dictated by some standards. The encapsulating MAP information element instructs devices receiving that particular data structure to interpret the enclosed MAP information element as applying not to a single frame, but to a large number of frames described by a pattern included in the encapsulating MAP information element.

In the case of unicast MAP information elements, such a data structure may be transmitted using a robust management connection, such as an ARQ or other similar technique. In this case, because the message transfer is robust, the semi-persistent MAP allocation may be subsequently torn down by means of an additional management message. The semi-persistent MAP allocation may also be made applicable for a finite time period, or alternatively, be made applicable indefinitely until torn down.

In the case of a broadcast or multicast message, however, a different technique may be utilized. Since broadcast and multicast messages cannot be assumed reliable, and the base station typically has no indication as to whether the message arrive. Consequently, such messages should adhere to some general principles. For example, semi-persistent MAP allocations should not be used with multicast messages and torn down with a subsequent message. Attempting to tear down such an allocation may result in multiple cases of unknown state in the mobile devices. In another example, such semi-persistent MAP allocations should be applicable for a finite period in the absence of a readily defined teardown mechanism. In yet another example, a multicast implementation should use a robustness scheme other than one based on ARQ. Some examples of suitable robustness schemes may be further described with reference to FIGS. 3 and 4.

Figure 2:
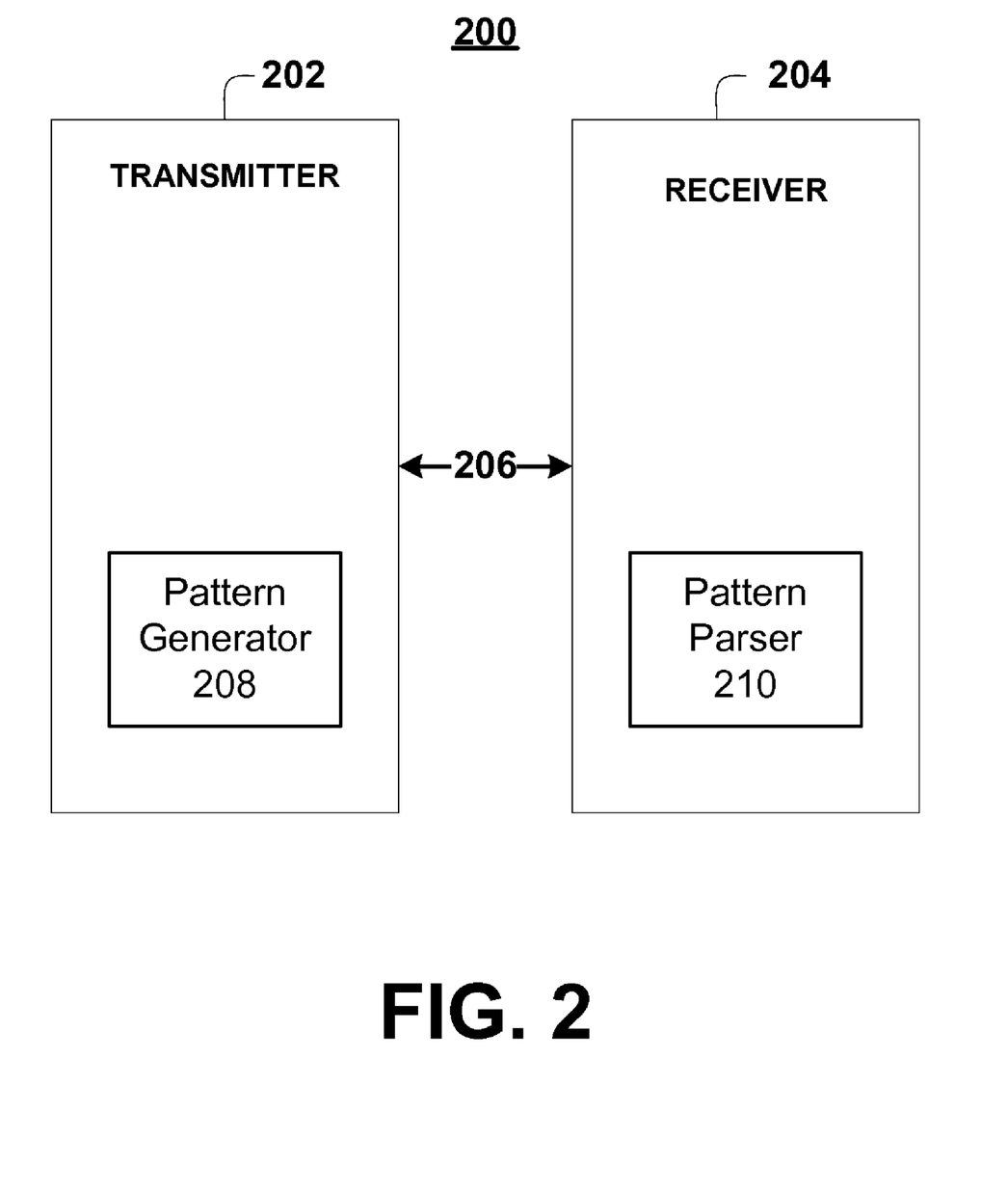
FIG. 2 illustrates one embodiment of a wireless network.

FIG. 2 illustrates a block diagram of one embodiment of a wireless network 200. For ease of illustration, and not limitation, the wireless network 200 depicts a limited number of nodes by way of example. It can be appreciated that more nodes may be employed for a given implementation.

As shown, the wireless network 200 may comprise a transmitter node 202 coupled to a receiver node 204. In various embodiments, the wireless communications system 200 may comprise or be implemented by one or more elements of the communications system 100 of FIG. 1, such as wireless network 100, transmitter node 102, and receiver nodes 104-1-n. The embodiments are not limited in this context.

In one embodiment, for example, the transmitter node 202 and the receiver node 204 may be implemented as wireless devices, and the wireless network 200 may be implemented as an IEEE 802.16 WMAN or WiMAX network. In such an embodiment, the wireless network 200 may communicate information in accordance with the information element defined by one or more of the 802.16 series of standards for WiMAX, implementing an associated protocol, and the transmitter node 202 may comprise a base station communicatively coupled to the receiver node 204 comprising a subscriber station. In various implementations, the wireless network 200 may support a unicast and/or multicast communication environment for distributing media content by unicasting and/or multicasting from the transmitter node 202 to the receiver node 204. The embodiments are not limited in this context.

In one embodiment, for example, the transmitter node 202 and the receiver node 204 each may include the capability to establish one or more wireless communication channels 206. In various embodiments, the communication channel 206 may be implemented at the MAC layer of the communication protocol stack within a transceiver and/or wireless communication chipset of a wireless device.

In various embodiments, the transmitter node 202 may include a pattern generator 208. Pattern generator 208 may be used to generate a pattern specification that is embedded within an encapsulating MAP information element. A pattern specification may include information that may be used by a receiver node 204 to determine which frames it should apply the MAP information element contained within the encapsulating MAP information element. An example of a pattern specification may be described in more detail with reference to FIG. 3 further below.

In various embodiments, the receiver node 204 may include a pattern parser 210. The receiver node 204 may receive the encapsulating MAP information element with the pattern specification and MAP information element. Pattern parser 210 may be used to parse, retrieve or otherwise interpret the pattern specification for use in applying the MAP information element to subsequently received communication frames, such as unicast frames, multicast frames, media frames, control frames, and other types of frames. Once parsed, the receiver node 204 may use the same MAP information element for multiple communication frames, thereby decreasing or eliminating the need to transmit MAP information for every communication frame.

Figure 3:
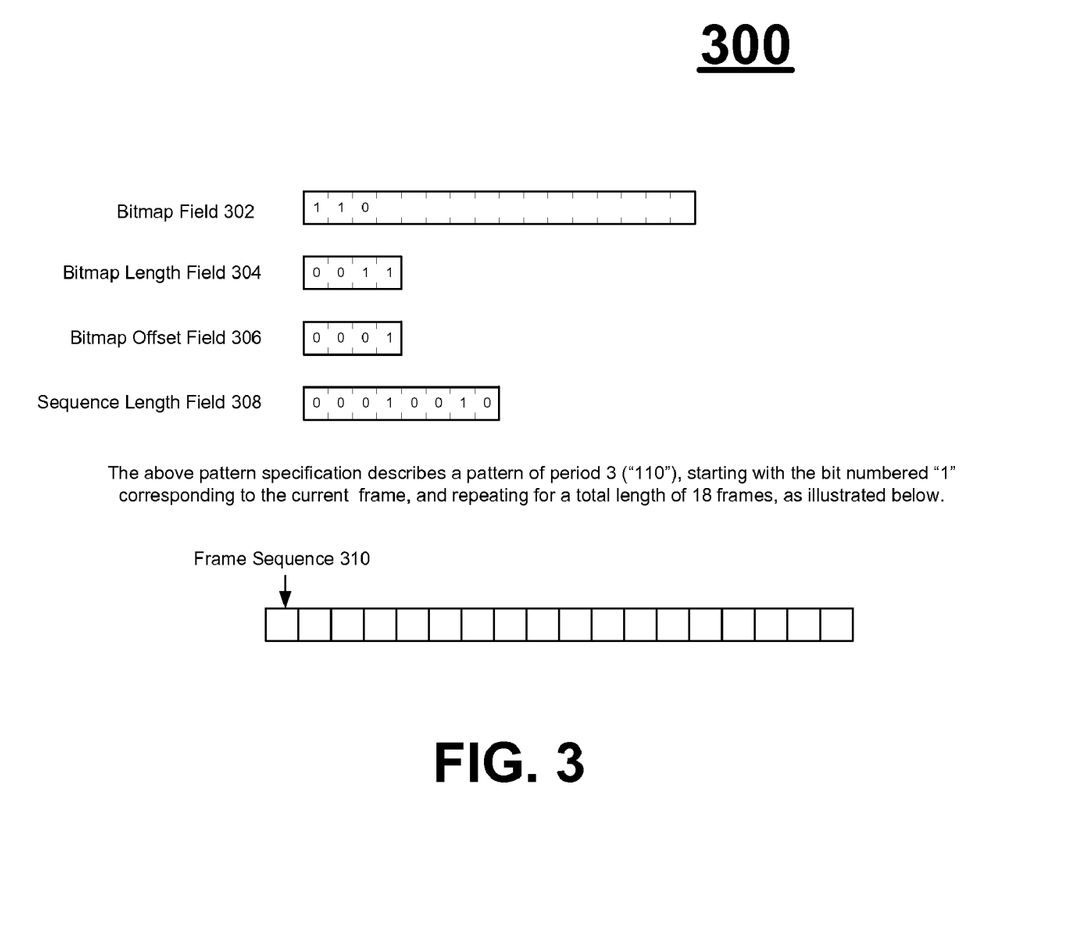
FIG. 3 illustrates one embodiment of a pattern specification.

FIG. 3 illustrates one embodiment of a pattern specification. FIG. 3 illustrates a data structure 300 to store and/or communicate a given pattern specification, set of pattern information, or pattern definition (collectively referred to herein as a "pattern specification"). FIG. 3 also illustrates how the pattern specification may be used to apply MAP information to subsequently received communication frames. Further, the data structure 300 shown in FIG. 3 may include a pattern specification that represents an example of a robustness scheme suitable for a multicast implementation. It may be appreciated that the pattern specification illustrated by data structure 300 is by way of example only and not limitation. The embodiments are not limited in this context.

In various embodiments, a multicast implementation may use a robustness scheme represented by the data structure 300. The robustness scheme is described here by way of example to a particular pattern specification design, without loss of generality. The pattern specification describes the frames to which the enclosed MAP information elements apply. As shown in FIG. 3, the data structure 300 contains at least four fields:

Bitmap Field 302 with a 16-bit pattern bitmap value;
Bitmap Length Field 304 with a 4-bit bitmap length value representing the number of bits of the bitmap which are to be used;
Bitmap Offset Field 306 with a 4-bit bitmap offset value representing the position in the bitmap corresponding to the current frame; and
Sequence Length Field 308 with an 8-bit sequence length value representing the duration of repetition of the sequence.

These four fields can describe a periodic sequence of frames, with a period of up to 16 frames, and for a duration of up to 256 frames. An example of the application of such a pattern is shown with frame sequence 310, where the pattern specification describes a bitmap with a pattern of period 3, starting with the bit numbered "1" corresponding to the current frame, and repeating for a total length of 18 frames. Other values may be used as well.

In the unicast case, the transmitter node 202 may transmit a pattern specification via data structure 300 using a management channel (e.g., communication channel 206) utilizing an ARQ technique, and may also permit the sequence length field 308 to be set to a value which represents "infinity." Such a pattern specification can be set up indefinitely until a subsequent management message requests it to be torn down.

Figure 4:
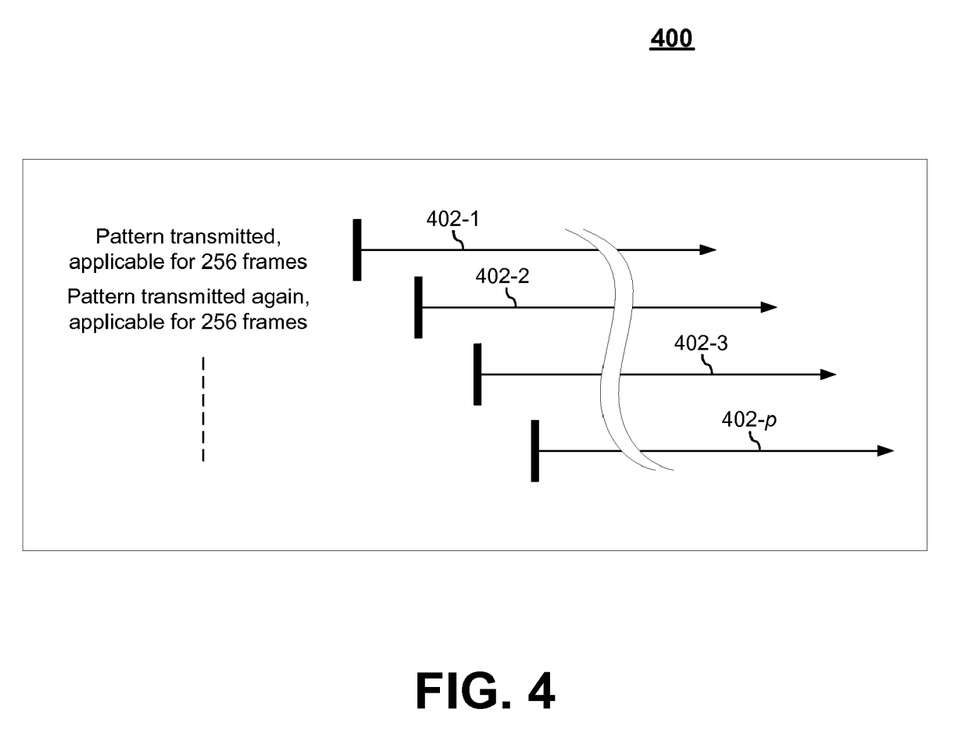
FIG. 4 illustrates one embodiment of multiple pattern specifications.

FIG. 4 illustrates one embodiment of a pattern specification for a long term multicast broadcast service (MBS) allocation. In the broadcast and multicast case, to provide robustness, the same set of MAP information elements may be sent multiple times in subsequent frames, using compatible pattern specifications. More particularly, a wireless device may be arranged to communicate the encapsulating MAP information element with a pattern specification having a pattern sequence length representing a first number of frames. The wireless device may communicate the same, or one or more compatible encapsulating MAP information elements, multiple times every second number of frames, with the second number of frames being less than the first number of frames. For example, a long term MBS allocation may be transmitted with a pattern sequence length of 256 frames. The long term MBS allocation, however, may be transmitted once every 16 frames, creating a rolling allocation as shown in FIG. 4. Each of the four shown transmissions 402-1-p of a pattern in the example is a compatible pattern, meaning that during the period for which each pair of patterns overlap, they identify the same frames in which the allocation applies. This can be achieved by, for instance, using the pattern specification defined earlier using the data structure 300, with the same bitmap and bitmap length, but changing a value for the bitmap offset 306 to ensure that the described patterns line up. Other rolling allocation techniques may be used as well, and the embodiments are not limited in this context.

A mobile device may use the receiver node 204 and the pattern parser 210 to receive and parse such a pattern specification, and determine that the allocation contents are the same as one previously received. The receiver node 204 can determine if the patterns are compatible while recognizing that the newer sequence length extends beyond that of the previous semi-persistent MAP allocation. In this case, the older semi-persistent MAP allocation can be discarded. In this way, a mobile device would need to fail to receive 16 such allocation transmissions in a row for the allocation to break. Nonetheless, the overhead required to send the information is reduced to $\frac{1}{16}^{th}$ of the original, in this example.

Operations for various embodiments may be further described with reference to the following figures and accompanying examples. Some of the figures may include a logic flow. It can be appreciated that an illustrated logic flow merely provides one example of how the described functionality may be implemented. Further, a given logic flow does not necessarily have to be executed in the order presented unless otherwise indicated. In addition, a logic flow may be implemented by a hardware element, a software element executed by a processor, or any combination thereof. The embodiments are not limited in this context.

Figure 5:
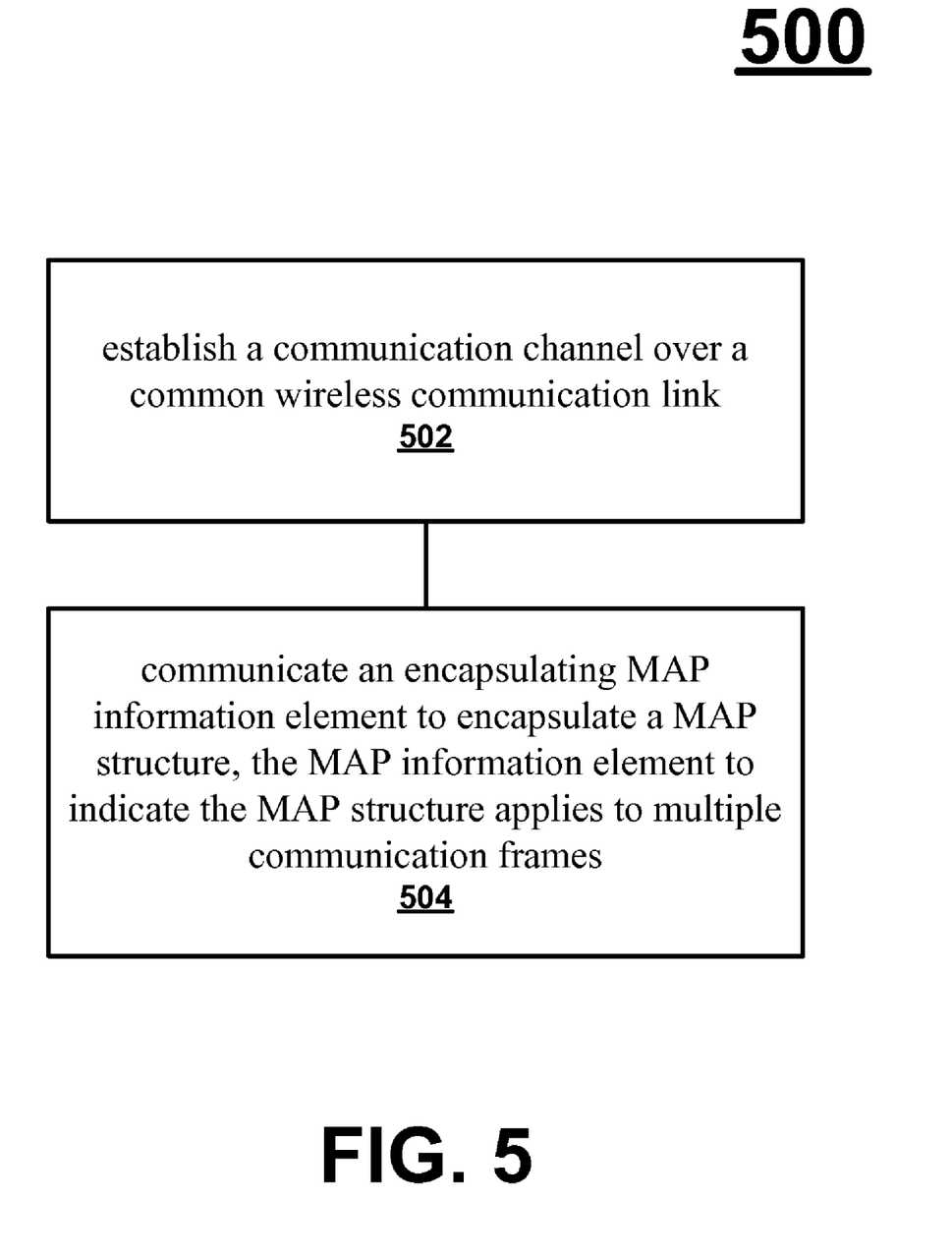
FIG. 5 illustrates one embodiment of a logic flow.

FIG. 5 illustrates one embodiment of a logic flow 500 for communicating a pattern specification with an encapsulating MAP information element. In various embodiments, the logic flow 500 may be performed by various systems, nodes, and/or modules and may be implemented as hardware, software, and/or any combination thereof, as desired for a given set of design parameters or performance constraints. For example, the logic flow 500 may be implemented by a logic device (e.g., transmitter node, receiver node) and/or logic comprising instructions, data, and/or code to be executed by a logic device. For purposes of illustration, and not limitation, the logic flow 500 is described with reference to FIG. 1. The embodiments are not limited in this context.

In one embodiment, for example, logic flow 500 may comprise establishing a communication channel over a common wireless communication link (block 502). The logic flow 500 may comprise communicating an encapsulating MAP information element to encapsulate a MAP information element, with the MAP information element to indicate the MAP information element applies to multiple communication frames (block 504). The embodiments are not limited in this context.

In various embodiments logic flow 500 may comprise communicating or sending various types of encapsulating MAP information elements based on a given communication technique. In one embodiment, for example, logic flow 500 may comprise communicating a unicast encapsulating MAP information element to indicate the MAP information element applies to multiple unicast communication frames. Logic flow 500 may also comprise communicating a multicast encapsulating MAP information element to indicate the MAP information element applies to multiple multicast communication frames. It may be appreciated that any number of different encapsulating MAP information elements may be defined as needed for a given implementation, and these are but two examples. The embodiments are not limited in this context.

In various embodiments, the logic flow 500 may comprise communicating or sending encapsulating MAP information elements with a pattern specification. The pattern specification may indicate which communication frames the MAP information element applies. In one embodiment, for example, the pattern specification may include one or more of a pattern bitmap value in a pattern bitmap field, a bitmap length value in a bitmap length field, a bitmap offset value in a bitmap offset field, and a sequence length value in a sequence length field.

Figure 6:
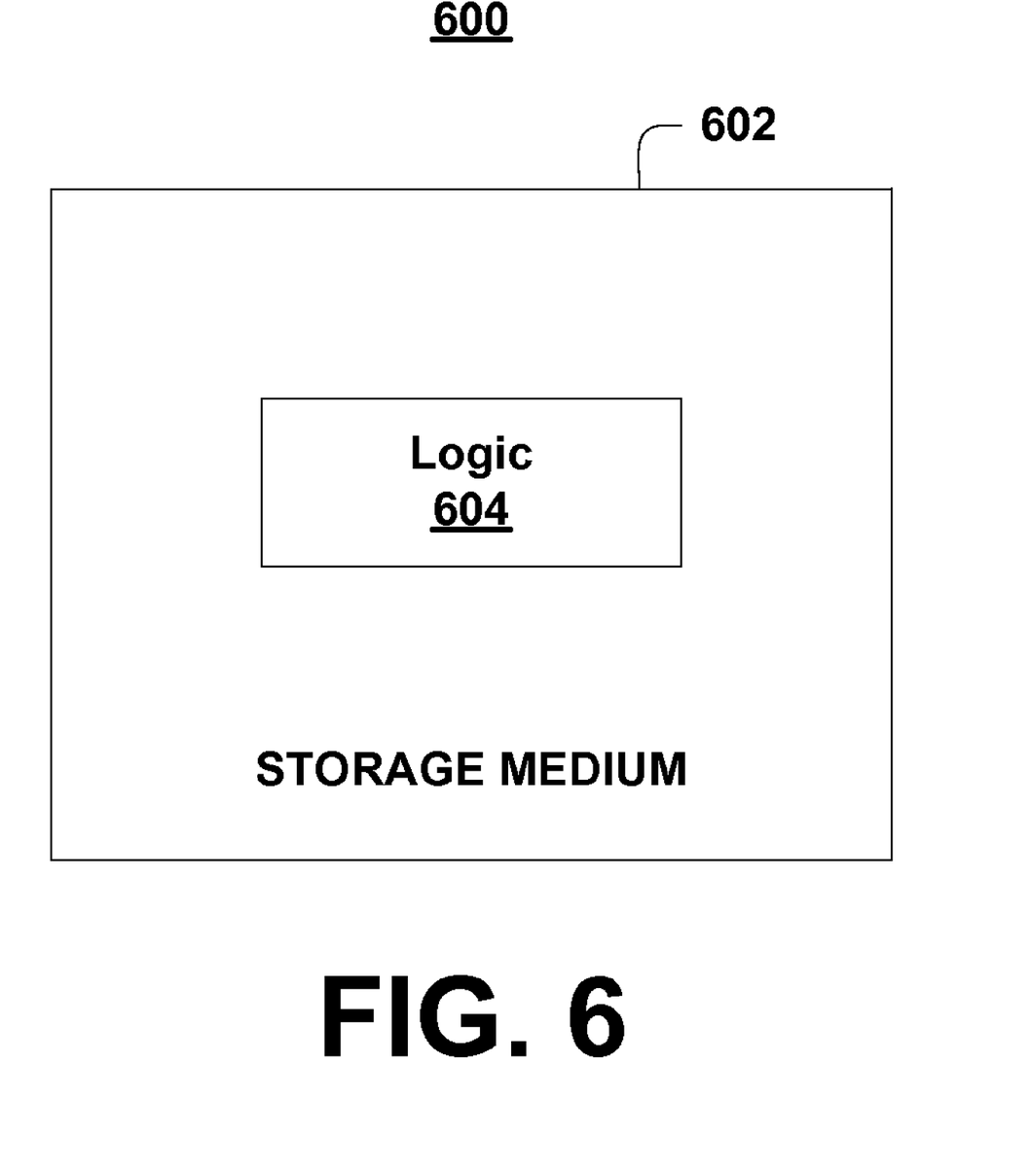
FIG. 6 illustrates one embodiment of an article of manufacture.

FIG. 6 illustrates one embodiment of an article of manufacture 600. As shown, the article 600 may comprise a storage medium 602 to store logic 604 for performing various operations associated with communicating MAP information elements using an encapsulating MAP information element. For example, logic 604 may be used to implement pattern generator 208 and/or pattern parser 210, as well as other aspects of the transmitter node (102, 202) and/or the receiver nodes (104-1-n, 204). In various embodiments, the article 600 may be implemented by various systems, nodes, and/or modules.

The article 600 and/or machine-readable storage medium 602 may include one or more types of computer-readable storage media capable of storing data, including volatile memory or, non-volatile memory, removable or non-removable memory, erasable or non-erasable memory, writeable or re-writeable memory, and so forth. Examples of a machine-readable storage medium may include, without limitation, random-access memory (RAM), dynamic RAM (DRAM), Double-Data-Rate DRAM (DDR-DRAM), synchronous DRAM (SDRAM), static RAM (SRAM), read-only memory (ROM), programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk (e.g., floppy disk, hard drive, optical disk, magnetic disk, magneto-optical disk), or card (e.g., magnetic card, optical card), tape, cassette, or any other type of computer-readable storage media suitable for storing information. Moreover, any media involved with downloading or transferring a computer program from a remote computer to a requesting computer carried by data signals embodied in a carrier wave or other propagation medium through a communication link (e.g., a modem, radio or network connection) is considered computer-readable storage media.

The article 600 and/or machine-readable medium 602 may store logic 604 comprising instructions, data, and/or code that, if executed by a machine, may cause the machine to perform a method and/or operations in accordance with the described embodiments. Such a machine may include, for example, any suitable processing platform, computing platform, computing device, processing device, computing system, processing system, computer, processor, or the like, and may be implemented using any suitable combination of hardware and/or software.

The logic 604 may comprise, or be implemented as, software, a software module, an application, a program, a subroutine, instructions, an instruction set, computing code, words, values, symbols or combination thereof. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context. When implemented the logic 604 is implemented as software, the software may be executed by any suitable processor and memory unit.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It is also worthy to note that any reference to "one embodiment" or "an embodiment" means that a particular feature, structure, or characteristic described in connection with the embodiment is included in at least one embodiment. Thus, appearances of the phrases "in one embodiment" or "in an embodiment" in various places throughout the specification are not necessarily all referring to the same embodiment. Furthermore, the particular features, structures or characteristics may be combined in any suitable manner in one or more embodiments.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus comprising a first device having one or more transceivers to establish a communication channel over a common wireless communication link, the first device to communicate, using the established communication channel, an encapsulating MAP information element to encapsulate one or more DL and UL MAP information elements, the encapsulating MAP information element to indicate the one or more encapsulated DL and UL MAP information elements each apply to multiple communication frames wherein the first device further includes a pattern generator to generate a pattern specification, the device to communicate the encapsulating MAP information element with the pattern specification to indicate which communication frames the DL and UL MAP information element applies.

2. The apparatus of claim 1, the first device to communicate a unicast encapsulating MAP information element to indicate the DL and UL MAP information element applies to multiple unicast communication frames.

3. The apparatus of claim 1, the first device to communicate a multicast encapsulating MAP information element to indicate the DL and UL MAP information element applies to multiple multicast communication frames.

4. The apparatus of claim 1, comprising a second device to receive the encapsulating MAP information element, the second device to include a pattern parser to parse a pattern specification from the encapsulating MAP information element, the second device to apply the DL and UL MAP information element to certain communication frames in accordance with the pattern specification.

5. The apparatus of claim 1, the first device to communicate the encapsulating MAP information element with a pattern specification, the pattern specification having a pattern bitmap value in a pattern bitmap field, a bitmap length value in a bitmap length field, a bitmap offset value in a bitmap offset field, and a sequence length value in a sequence length field.

6. The apparatus of claim 1, the device to communicate the encapsulating MAP information element with a pattern specification having a pattern sequence length representing a first number of frames, the device to communicate a compatible encapsulating MAP information element multiple times every second number of frames, with the second number of frames being less than the first number of frames.

7. A system comprising:
a transmitter node to establish a communication channel over a wireless communication link, the transmitter node to communicate, using the established communication channel, an encapsulating MAP information element to encapsulate one or more DL and UL MAP information elements, the encapsulating MAP information element to indicate the one or more DL and UL MAP information elements each apply to multiple communication frames; and
an antenna coupled to the transmitter node to support communication over the wireless communication link.

8. The system of claim 7, the transmitter node to communicate the encapsulating MAP information element with a pattern specification to indicate which communication frames the DL and UL MAP information element applies.

9. The system of claim 7, comprising a receiver node to receive the encapsulating MAP information element, the receiver node to include a pattern parser to parse a pattern specification from the encapsulating MAP information element, and apply the DL and UL MAP information element to a frame sequence in accordance with the pattern specification.

10. A method comprising:
establishing a communication channel over a common wireless communication link; and
communicating, using the established communication channel, an encapsulating MAP information element to encapsulate one or more DL and UL MAP information elements, the encapsulating MAP information element to indicate the one or more encapsulated DL and UL MAP information elements each apply to multiple communication frames.

11. The method of claim 10, communicating a unicast encapsulating MAP information element to indicate the DL and UL MAP information element applies to multiple unicast communication frames.

12. The method of claim 10, communicating a multicast encapsulating MAP information element to indicate the DL and UL MAP information element applies to multiple multicast communication frames.

13. The method of claim 10, communicating the encapsulating MAP information element with a pattern specification to indicate which communication frames the DL and UL MAP information element applies.

14. The method of claim 10, communicating the encapsulating MAP information element with a pattern specification having a pattern bitmap value in a pattern bitmap field, a bitmap length value in a bitmap length field, a bitmap offset value in a bitmap offset field, and a sequence length value in a sequence length field.

15. An article comprising a non-transitory machine-readable storage medium containing instructions that if executed enable a system to:
establish a communication channel over a common wireless communication link;

and communicate, using the established communication channel, an encapsulating MAP information element to encapsulate one or more DL and UL MAP information elements, the encapsulating MAP information element to indicate the one or more DL and UL MAP information elements each apply to multiple communication frames.

16. The article of claim 15, further comprising instructions that if executed enable a system to communicate a unicast encapsulating MAP information element to indicate the DL and UL MAP information element applies to multiple unicast communication frames.

17. The article of claim 15, further comprising instructions that if executed enable a system to communicate a multicast encapsulating MAP information element to indicate the DL and UL MAP information element applies to multiple multicast communication frames.

18. The article of claim 15, further comprising instructions that if executed enable a system to communicate the encapsulating MAP information element with a pattern specification to indicate which communication frames the DL and UL MAP information element applies.

19. The article of claim 15, further comprising instructions that if executed enable a system to communicate the encapsulating MAP information element with a pattern specification having a pattern bitmap value in a pattern bitmap field, a bitmap length value in a bitmap length field, a bitmap offset value in a bitmap offset field, and a sequence length value in a sequence length field.

* * * * *

UNITED STATES PATENT AND TRADEMARK OFFICE
CERTIFICATE OF CORRECTION

| | | |
|---|---|---|
| PATENT NO. | : 7,852,826 B2 | Page 1 of 1 |
| APPLICATION NO. | : 11/537293 | |
| DATED | : December 14, 2010 | |
| INVENTOR(S) | : Duncan Kitchin | |

It is certified that error appears in the above-identified patent and that said Letters Patent is hereby corrected as shown below:

On Title page, in field (54), in "Title", line 1, delete "COMMUNICATION" and insert -- COMMUNICATE --, therefor.

In column 1, line 1, delete "COMMUNICATION" and insert -- COMMUNICATE --, therefor.

Signed and Sealed this
First Day of March, 2011

David J. Kappos
*Director of the United States Patent and Trademark Office*